Oct. 21, 1924.

H. A. CLARK

HOISTING ATTACHMENT FOR TRACTORS

Filed July 22, 1924  3 Sheets-Sheet 2

1,512,199

Harry A Clark
INVENTOR.

BY John M Fellman
ATTORNEYS.

Filed July 22, 1924     3 Sheets-Sheet 3

Harry A. Clark
INVENTOR.
BY
ATTORNEYS.

HOISTING ATTACHMENT FOR TRACTORS.

Application filed July 22, 1924. Serial No. 727,517.

*To all whom it may concern:*

Be it known that I, HARRY A. CLARK, a citizen of the United States, residing at Wichita Falls, in the county of Wichita and State of Texas, have invented certain new and useful Improvements in Hoisting Attachments for Tractors, of which the following is a specification.

This invention relates to tractors and refers more particularly to a frame for hoisting attachments therefor, the principal object being to provide an arrangement of this character which will prolong the life of the tractor and tend to neutralize vibration common to tractors and which may be operated by the driver of the tractor without necessity of his dismounting from the seat.

A further object of the invention is to provide a frame for a portable hoisting device in attachment to tractors with proper facilities provided for the adjustment of various parts thereof and which may be economically constructed and enable the hoisting attachment to be operated at a minimum of cost.

Features of the invention lie in its compact and durable construction and assembly of parts, and the facilities provided for the substitution of worn and inoperative parts when adjacent parts are still in good operative condition.

With these and other various features and objects in view the following is intended as a full, clear and exact description of the invention as claimed and of which the accompanying drawing forms a part.

Figure 1:
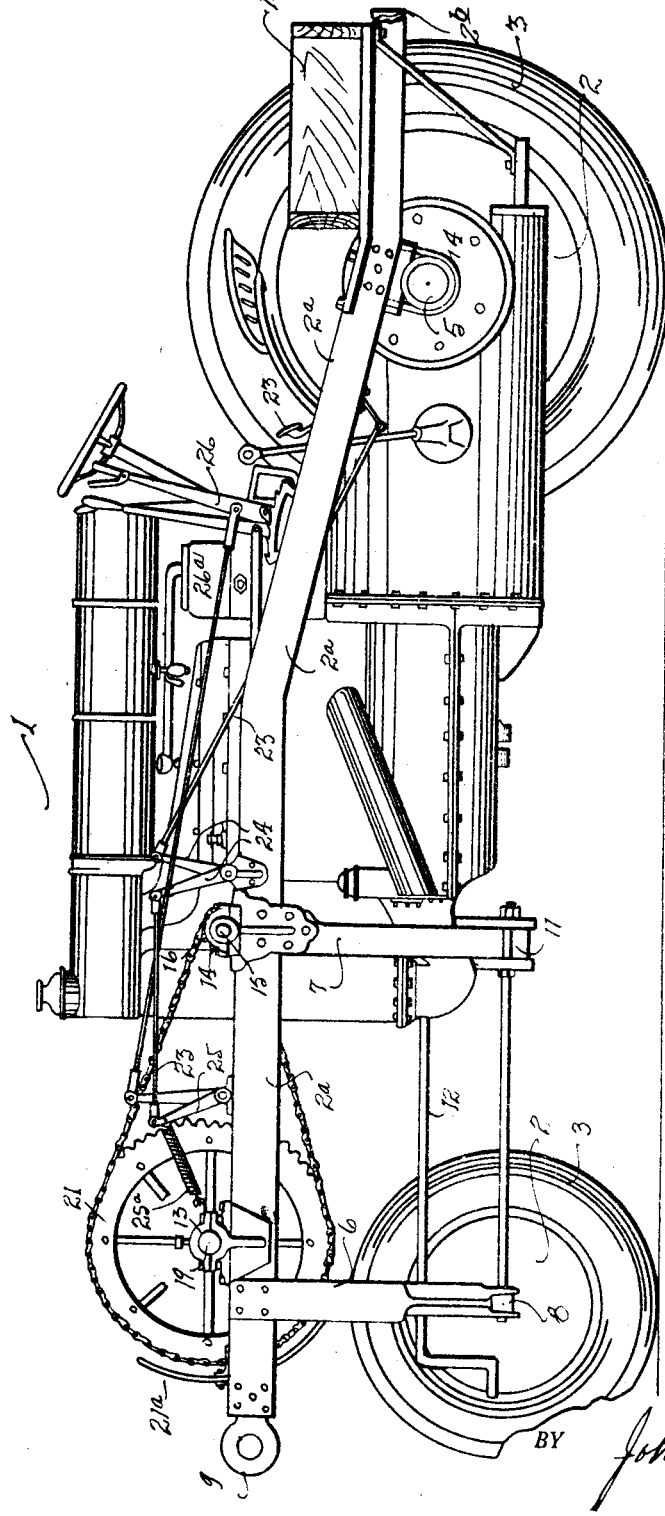
Figure 1 represents a side elevational view of a tractor showing the invention in attachment thereto.

In the course of the following description, similar characters of reference are used to indicate various working parts in the assembly of the invention wherein 1 denotes a tractor upon wheels 2—2, which latter are provided with pneumatic tires 3—3.

Extending longitudinally the length of the tractor and slightly beyond the front portion thereof, on opposite sides of the body portion are situated a pair of beams $2^a$—$2^a$, which provide the necessary frame and supporting structure for the hoist drum and its associated elements.

The beams $2^a$ are substantially supported in the position described by being rigidly secured by means of U bolts 4, to the rear axle 5 of the tractor, also to the upwardly disposed arms of the U shaped standards or cross-members 6 and 7.

It will be noted that these beams extend obliquely from the rear axle to a point approximately one third their length, thence on a horizontal line past the front of the tractor, terminating in a ring 9. Upon an extension from the opposite end of these beams is situated a tool box 10.

Figure 4:
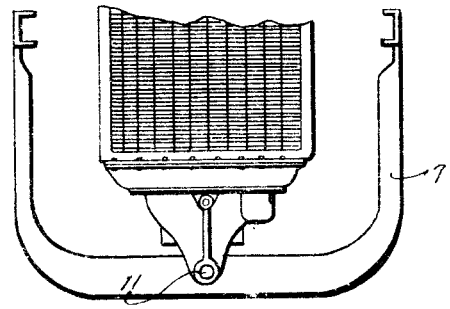
Figure 4 illustrates the preferred form of pivotal attachment of the apparatus to the front axle.

The U shaped cross-member 6, previously mentioned is pivotally engaged, centrally at its lower portion to the cross-member 8 of the tractor. In a similar manner the U shaped member 7 is secured directly beneath the radiator of the tractor by the rod 11 so that the latter not only serves as a common pivot for the two U-members 6 and 7 but also as a brace therebetween. This attachment is illustrated in detail in Figure 4. It will also be observed that the crank shaft is elongated in order that the same may be accessible at the extreme front of the apparatus. This feature is indicated by the numeral 12.

Suitably spaced apart along the upper surface of the beams $2^a$ are bearings 13 and 14. These bearings are divided into two separate pieces in order that proper facilities may be provided for the purpose of adjustment, such as the tightening of the bolts to eliminate lateral play and lost motion, due to wear. This feature is outstanding in the construction of the invention.

Figure 2:
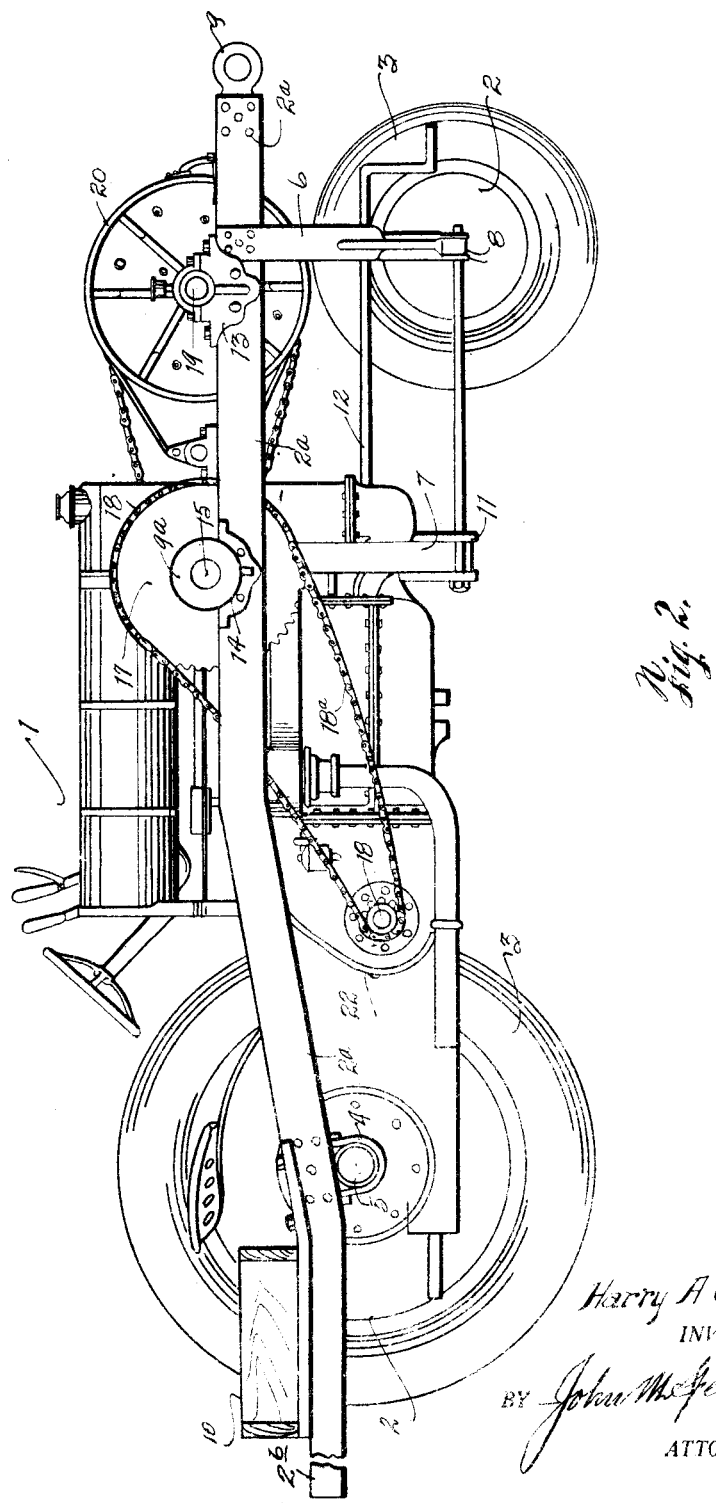
Figure 2 is a similar view.

A transverse shaft 15 extends across the frame members $2^a$—$2^a$ and operates in the bearings 14, upon one end of which is mounted a small sprocket gear 16, illustrated in Figure 1. This gear provides the motive power for the hoist by transmitted power from the large sprocket gear 17 on the opposite side of the machine, as illustrated in Figure 2, which is in turn driven by motive power derived from the tractor itself, through the sprocket 18 and chain $18^a$, also shown in Figure 2.

Figure 3:
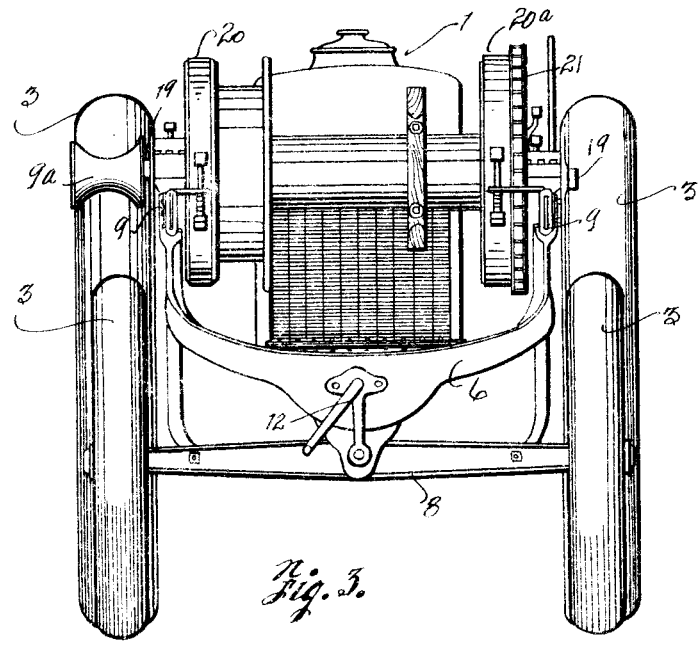
Figure 3 represents a front view of a tractor with the invention in attachment thereon.

Referring to the hoist drum and its associated elements, a better idea of which may be had by reference to Figure 3 of the drawings; this drum is operated upon a comparatively large shaft 19, which revolves in bearings 13, and which is extended past the frame of the machine, to provide an extension of suitable length to accommodate a spool 9ª, commonly termed "cat head." Situated upon this shaft 19, in horizontal alignment with a pair of brake bands and drums 20 and 20ª, is another large sprocket wheel 21, operated through the small sprocket gear 16, previously mentioned. This sprocket is provided with a guard 21ª. A similar guard 22 is provided for the gear 18.

In order to provide the necessary braking power for the hoist, it has been found necessary to equip the apparatus with two large brake bands 20 and 20ª, hereinbefore mentioned. The brake is applied to the band 20ª by means of the foot brake pedal 23, illustrated in Figure 1, also through rods 23ª, arms 24 and 25. The necessary tension being provided by spring 25ª. The brake is applied on the drum 20 through the lever 26 and rods 26ª, which arrangement is also clearly illustrated in Figure 1.

The foregoing description is given merely in order that a better understanding may be had regarding the more essential details of the invention, which consist in the frame extension, the three point suspension, and the elimination of all non-essential details which may tend to impair the operative usefulness and utility of the tractor.

It will be readily observed that the frame is assembled with a view of applying the greater weight of the apparatus toward the center of the machine, which obviously relieves the front cross-member 8 of an excessive amount of weight.

The pivotal suspension of the frame, which is established through the two U shaped members 6 and 7 is also obviously effective in neutralizing to a great extent an unusual amount of lateral vibration, during the operation of the apparatus, which vibration tends to wear upon and impair the various working parts of the machinery and causes extensive strain upon the frame.

Therefore in view of the above, it will be seen that the utility of the tractor is in no way impaired by the attachment of the apparatus thereto, in fact its variety of uses is practically doubled and it should be understood that it is not desired that the invention should be limited to the specific construction as herein disclosed, and that such minor changes may be made in the arrangement and construction of the invention that fall within the scope of the invention and in keeping with the following claims: The beams 2ª may be extended at 2ᵇ to enable an air compressor to be attached thereto, if desired.

I claim:

1. In combination with a tractor, a pair of side beams extending longitudinally thereof on opposite sides of its body and secured at their rear ends to the rear axle of the tractor, the beams projecting forwardly of the tractor, a U-shaped member fixed at its upper ends to the side beams and pivotally connected to the tractor beneath its radiator, a second U-shaped member disposed forwardly of the tractor and fixed at its upper ends to the front ends of the side beams, a front axle centrally pivoted to the second U-member, and a common pivoting rod interposed between and forming the two pivot connections for said U-members.

2. In combination with a tractor, a pair of side beams extending longitudinally thereof on opposite sides of its body and secured at their rear ends to the rear axle of the tractor, the beams projecting forwardly of the tractor, a U-shaped member fixed at its upper ends to the side beams and pivotally connected to the tractor beneath its radiator, a second U-shaped member disposed forwardly of the tractor and fixed at its upper ends to the front ends of the side beams, a front axle centrally pivoted to the second U-member, a common pivoting rod connecting the two pivot connections of said U-members, a hoist drum journaled on the side beams adjacent the fixed ends of the second U-member, and a drive shaft for the drum journaled on the side beams adjacent the fixed ends of the first U-member.

3. In combination with a tractor, a pair of side beams extending longitudinally thereof on opposite sides of its body and extended over the rear axle of the tractor and secured at their rear ends to the rear axle of the tractor, the beams projecting forwardly of the tractor, a U-shaped member fixed at its upper ends to the side beams and pivotally connected to the tractor beneath its radiator, a second U-shaped member disposed forwardly of the tractor and fixed at its upper ends to the front ends of the side beams, a front axle centrally pivoted to the second U-member, a common pivoting rod connecting the two pivot connections of said U-members, a hoist drum journaled on the side beams adjacent the fixed ends of the second U-member, and a drive shaft for the drum journaled on the side beams adjacent the fixed ends of the first U-member.

In testimony whereof I have signed my name to this specification.

HARRY A. CLARK.